United States Patent [19]
Olson et al.

[11] Patent Number: 5,985,444
[45] Date of Patent: Nov. 16, 1999

[54] AMIDE FUNCTIONAL ULTRAVIOLET LIGHT ABSORBERS FOR FLUOROPOLYMERS

[75] Inventors: David B. Olson, May Township; David M. Burns; Bruce B. Wilson, both of Woodbury, all of Minn.

[73] Assignee: 3M Innovative Properties Company, St. Paul, Minn.

[21] Appl. No.: 09/054,646

[22] Filed: Apr. 3, 1998

[51] Int. Cl.$^6$ .............................. B32B 19/00; C08K 5/02
[52] U.S. Cl. ...................... 428/357; 548/259; 548/260; 548/261; 526/259; 524/91; 524/359; 524/502; 524/505; 524/507; 524/539; 524/543; 524/545; 524/565; 428/357; 428/424.7
[58] Field of Search ................... 548/259, 260, 548/261; 526/259; 524/91, 359, 462, 502, 505, 507, 539, 543, 545, 565; 428/357, 424.7

[56] References Cited

U.S. PATENT DOCUMENTS

| | | | |
|---|---|---|---|
| 4,500,694 | 2/1985 | Ohmori | 526/428 |
| 4,566,755 | 1/1986 | Ohmori | 350/526 |
| 4,569,871 | 2/1986 | Ohmori | 428/428 |
| 4,609,715 | 9/1986 | Koishi | 526/245 |
| 4,732,941 | 3/1988 | Numa | 525/524 |
| 4,742,140 | 5/1988 | Greenwood | 526/245 |
| 4,767,659 | 8/1988 | Bailey | 428/156 |
| 4,853,471 | 8/1989 | Rody | 548/524 |
| 5,042,924 | 8/1991 | Terasaki | 359/252 |
| 5,085,918 | 2/1992 | Rajan | 428/428 |
| 5,194,113 | 3/1993 | Lasch | 156/156 |
| 5,227,194 | 7/1993 | DeLaSierra | 427/40 |
| 5,242,976 | 9/1993 | Strassel | 525/525 |
| 5,450,235 | 9/1995 | Smith | 359/359 |
| 5,547,558 | 8/1996 | Sakamoto | 205/205 |
| 5,691,846 | 11/1997 | Benson | 359/359 |

FOREIGN PATENT DOCUMENTS

| | | |
|---|---|---|
| 0 057 160 A1 | 8/1982 | European Pat. Off. . |
| WO 97/42261 | 11/1997 | WIPO . |

OTHER PUBLICATIONS

March, Advanced Organic Chemistry, $3^{rd}$ Ed, pp. 71–73, John Wiley & Sons (1985).
Symons, Chemical Society Reviews, 12, pp. 1–34 (1983).
Encyclopedia of Polymer Science & Engineering, $2^{nd}$ Ed., vol. 17 pp. 468–491 and 532–548 Vinyl Fluoride Polymers & Vinylidene Fluoride Polymers (1985).
Encyclopedia of Polymer Science & Engineering, $2^{nd}$ Ed., vol. 16, pp. 577–648, Tetrafluoroethylene Polymers (1985).

*Primary Examiner*—Samuel A. Acquah
*Attorney, Agent, or Firm*—F. Andrew Ubel

[57] ABSTRACT

An ultraviolet light absorbing material that resists blooming and migration is made up of a fluoropolymer and an amide functional ultraviolet light absorbing compound, wherein the polymer and the amide functional ultraviolet light absorbing compound are hydrogen bonded to one another. Polymeric films that contain a polymeric matrix and the ultraviolet light absorbing material are useful as the top layer in multilayer constructions such as retroreflective sheetings and conformable marking sheets.

31 Claims, No Drawings

AMIDE FUNCTIONAL ULTRAVIOLET LIGHT ABSORBERS FOR FLUOROPOLYMERS

FIELD OF THE INVENTION

This invention relates to ultraviolet light absorbing materials that comprise a fluoropolymer and an amide functional ultraviolet light absorbing compound. The invention also relates to films that incorporate such ultraviolet light absorbing materials and to articles that include such films.

BACKGROUND OF THE INVENTION

The effect of ultraviolet light on articles such as retroreflective sheetings for use on license plates or signage articles that are exposed to the sun or other sources of ultraviolet light are of great concern to the manufacturers of such articles. Over time, constant or repeated exposure to ultraviolet light can result in fading of the dyes and pigments used in such articles and in the degradation or breakdown of the adhesives, polymers, and other materials used in the construction of the articles. This fading and degradation shortens the useful life of the articles in question, making protection from ultraviolet light exposure an issue of great importance to the manufacturers of such articles.

Molecules that function as ultraviolet light absorbers are generally known in the art. For example, in U.S. Pat. No. 4,853,471 Rody et al. describe 2-(2-hydroxyphenyl)-benzotriazole compounds that are useful as ultraviolet light absorbers. These compounds are described as useful in the stabilization of a wide variety of polymeric materials against ultraviolet light, particularly those that are used in the preparation of photographic materials.

Fluoropolymers are sometimes used as top films in multilayer constructions which are exposed to ultraviolet light. The incompatibility of known ultraviolet absorbing compounds with such fluoropolymers limits their long term usefulness in such constructions. The low solubility and/or high mobility of typical ultraviolet light absorbers in fluoropolymers results in an inability to maintain high levels of these compounds in fluoropolymeric films; the compounds tend to bloom or migrate out of the film, and the protective properties of the compounds are lost.

Therefore, a need exists for ultraviolet light absorbing materials that are compatible with and resist blooming out of fluoropolymers, and for products such as fluoropolymeric films and other articles that incorporate such a material.

SUMMARY OF THE INVENTION

The invention provides an ultraviolet light absorbing material made up of a fluoropolymer and an amide functional ultraviolet light absorbing compound, wherein the ultraviolet light absorbing compound is hydrogen bonded to the fluoropolymer and there is at least one hydrogen bonding site on the polymer per mole of ultraviolet light absorbing compound. For the sake of clarity, the invention will be described with reference to fluoropolymers (i.e., products containing a polymer which includes chain units of the formula

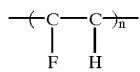

The invention also provides a polymeric film made up of a polymeric matrix and an ultraviolet light absorbing material, said ultraviolet light absorbing material made up of a fluoropolymer and an amide functional ultraviolet light absorbing compound, wherein the amide functional ultraviolet light absorbing compound is hydrogen bonded to the fluoropolymer and there is at least one hydrogen bonding site on the polymer per mole of ultraviolet light absorbing compound. By "copolymeric matrix" is meant a matrix comprising one or more homopolymers, copolymers, polymer blends, or polymer alloys. The ultraviolet light absorbing material must be compatible with the polymeric matrix, i.e., it is miscible therein or can be blended therein.

The invention further provides a method of protecting a substrate from the effects of ultraviolet light, the method comprising applying a polymeric film to the substrate, said film comprising a polymeric matrix and an ultraviolet light absorbing material, said ultraviolet light absorbing material comprising a fluoropolymer and an amide functional ultraviolet light absorbing compound, wherein the ultraviolet light absorbing compound is hydrogen bonded to the fluoropolymer and there is at least one hydrogen bonding site on the polymer per mole of ultraviolet light absorbing compound.

In addition the invention provides products such as retroreflective sheetings, signage articles and conformable marking sheets that comprise the polymer films of the invention. In one such aspect the invention provides a conformable marking sheet comprising a top polymeric film layer having glass microspheres and skid resistant particles partially embedded therein, the film comprising a polymer matrix and an ultraviolet light absorbing material, the ultraviolet light absorbing material comprising a fluoropolymer and an amide functional light absorbing compound, wherein the amide functional ultraviolet light absorbing compound is hydrogen bonded to the fluoropolymer and there is at least one hydrogen bonding site on the polymer per mole of ultraviolet light absorbing compound; an optional base layer, e.g., comprising a deformable thermoplastic polymer and a nonreinforcing mineral particulate; an optional adhesive layer, e.g., pressure sensitive adhesive; and an optional release liner.

In another aspect of the invention is provided an enclosed-lens retroreflective sheeting, e.g., comprising a layer of lenses anchored in a binder layer, a specularly reflective layer underlying the lenses, and a top layer comprising a polymeric film, said film comprising a polymeric matrix and an ultraviolet light absorbing material, said ultraviolet light absorbing material comprising a fluoropolymer and an amide functional ultraviolet light absorbing compound, wherein the amide functional ultraviolet light absorbing compound is hydrogen-bonded to the fluoropolymer and there is at least 1 hydrogen bonding site on the polymer per molecule of ultraviolet light absorbing compound. Embedded-lens retroreflective sheetings and encapsulated-lens retroreflective sheetings may be made in accordance with the invention. Retroreflective signs and articles including such sheetings are also provided.

In another aspect, the invention provides a cube corner type retroreflective article comprising an overlay or cover layer with a layer of cube corner shaped elements on a side thereof wherein the overlay or cover layer comprises a film comprising a polymeric matrix and an ultraviolet light absorbing material, the ultraviolet light absorbing material comprising a fluoropolymer and an amide functional light absorbing compound, wherein the amide functional ultraviolet light absorbing compound is hydrogen bonded to the fluoropolymer and there is at least one hydrogen bonding site on the polymer per mole of ultraviolet light absorbing compound.

The term "polymer" is used herein to refer to compounds that have more than one occurrence of a given monomeric structural unit.

As used herein the term "amide functional ultraviolet light absorbing compound" refers to a compound that absorbs ultraviolet light and that contains at least one —CONH— moiety. The term "UVA" is used interchangeably with the term "amide functional ultraviolet light absorbing compound".

DETAILED DESCRIPTION OF THE ILLUSTRATIVE EMBODIMENTS OF THE INVENTION

Ultraviolet Light Absorbing Material

As described above, the ultraviolet light absorbing material of the invention is composed of an amide functional light absorbing compound and a fluoropolymer. In these materials there is at least one hydrogen bonding site present on the polymer per mole of ultraviolet light absorbing compound and the amide functional ultraviolet light absorbing compound is hydrogen bonded to the fluoropolymer.

In addition to absorbing ultraviolet light, the UVA's useful in the invention are preferably transparent to visible light. Useful classes of amide functional ultraviolet light absorbing compounds include amide containing 2-hydroxyphenylbenzotriazoles, 2-hydroxybenzophenones, phenylene-bis-benzoxazinones, diphenylcyanoacrylates, and triazines.

Any 2-hydroxyphenylbenzotriazole ultraviolet light absorbing compound that contains an amide group may be used in the material of the invention. Suitable 2-hydroxyphenylbenzotriazole compounds include those having formula (I):

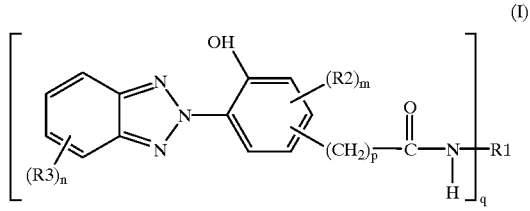

(I)

wherein R1 is straight-chain or branched $C_1$–$C_{18}$ alkyl, straight-chain or branched $C_3$–$C_{18}$ alkyl which is interrupted by O, S, or —NR4—, $C_5$–$C_{12}$ cycloalkyl, $C_6$–$C_{14}$ aryl, $C_7$–$C_{15}$ aralkyl in which alkyl group is straight-chain or branched, straight-chain or branched $C_3$–$C_{18}$ alkenyl, $C_1$–$C_3$ hydroxyalkyl or

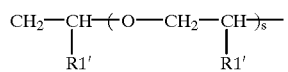

wherein R1' is H or straight-chain or branched $C_{1-6}$ alkyl; R4 is H, straight-chain or branched $C_1$–$C_{18}$ alkyl, $C_6$–$C_{12}$ cycloalkyl, straight-chain or branched $C_3$–$C_8$ alkenyl, $C_6$–$C_{14}$ aryl or $C_7$–$C_{18}$ aralkyl;

each R2 is independently halogen, hydroxy, straight-chain or branched $C_{1-6}$ alkyl, $C_7$–$C_{15}$ aralkyl in which alkyl is straight-chain or branched, straight-chain or branched $C_{1-6}$ alkoxy, straight-chain or branched $C_{1-6}$ alkanol, amino, straight-chain or branched $C_{1-6}$ alkylamino, or straight-chain or branched $C_{1-6}$ dialkylamino;

each R3 is independently halogen, hydroxy, straight-chain or branched $C_{1-6}$ alkyl, $C_7$–$C_{15}$ aralkyl in which alkyl is straight-chain or branched, straight-chain or branched $C_{1-6}$ alkoxy, straight-chain or branched $C_{1-6}$ alkanol, amnino, straight-chain or branched $C_{1-6}$ alkylamino, straight-chain or branched $C_{1-6}$ dialkylamino, or aliphatic or aromatic substituted sulfoxide or sulfone

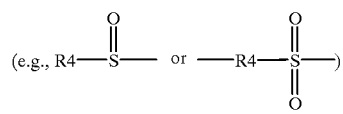

m is 0 to 3;

n is 0 to 4;

p is 1 to 6;

q is 1 or 2; and s is 2 to 10.

Of these, 2-hydroxyphenylbenzotriazole compounds having formula (II) are preferred:

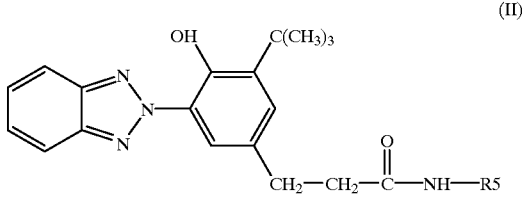

(II)

wherein R5 is straight-chain or branched $C_8$ alkyl.

Another useful class of ultraviolet light absorbing compounds is the 2-hydroxybenzophenones. So long as they contain at least one amide group, any of the 2-hydroxybenzophenone ultraviolet light absorbing compounds may be used. Examples of 2-hydroxybenzophenone compounds that may be used in the invention include those of formula (III):

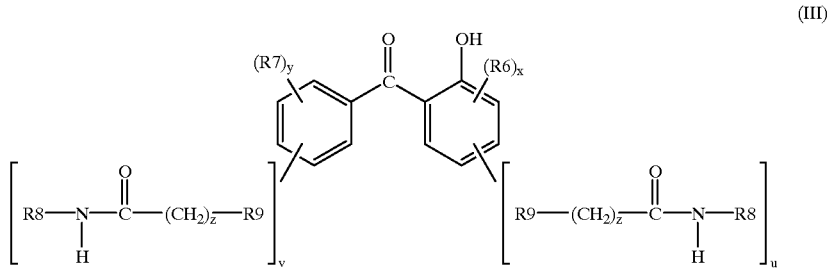

(III)

wherein each R9 is independently a covalent bond, —O—, —S—, —CO—, or —NR10—; each R8 is independently straight-chain or branched $C_1$–$C_{18}$ alkyl, straight-chain or branched $C_3$–$C_{18}$ alkyl which is interrupted by O, S or —NR10—, $C_5$–$C_{12}$ cycloalkyl, $C_6$–$C_{14}$ aryl, $C_7$–$C_{15}$ aralkyl, straight-chain or branched $C_3$–$C_8$ alkenyl, or $C_1$–$C_3$ hydroxyalkyl; R10 is H, straight-chain or branched $C_1$–$C_{18}$ alkyl, $C_6$–$C_{12}$ cycloalkyl, straight-chain or branched $C_3$–$C_8$ alkenyl, $C_6$–$C_{14}$ aryl or $C_7$–$C_{18}$ aralkyl;

each R6 is independently halogen, hydroxy, straight-chain or branched $C_{1-18}$ alkyl, straight-chain or branched $C_{1-18}$ alkoxy, straight-chain or branched $C_{1-18}$ alkanol, amino, straight-chain or branched $C_{1-6}$ alkylamino, or straight-chain or branched $C_{1-6}$ dialkylamino;

each R7 is independently halogen, hydroxy, straight-chain or branched $C_{1-8}$ alkyl, straight-chain or branched $C_{1-18}$ alkoxy, straight-chain or branched $C_{1-18}$ alkanol, amino, straight-chain or branched $C_{1-6}$ alkylamino, or straight-chain or branched $C_{1-6}$ dialkylamino;

u and v are independently 0 or 1, provided that u+v=at least 1;

x is 0 to 4;

y is 0 to 5; and each z is independently 0 to 6.

2-hydroxybenzophenone compounds of formula (III) may be prepared by methods known in the art, such as by the reaction of an acid of formula

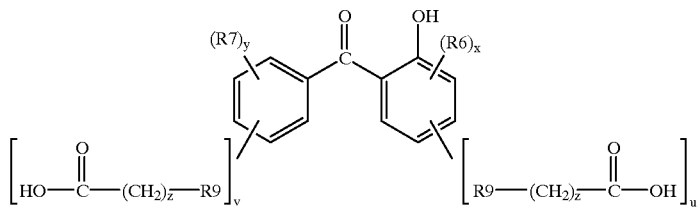

with the corresponding amine.

Examples of particular 2-hydroxybenzophenone compounds useful in the invention include compounds of formulas (IV) or (V):

(IV)

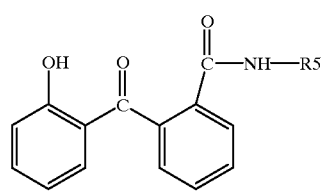

(V)

wherein R5 is a straight-chain or branched $C_8$ alkyl group.

Dimers of any of these ultraviolet light absorbing compounds can be used as well.

Other ultraviolet light absorbing compounds may also be used, provided they contain at least one amide group. Examples of such compounds include p-hydroxybenzoates, triazines and phenylene-bis-benzoxazin-ones. One or more amide functional ultraviolet light absorbing compounds may be used alone or in combination in the materials and films of the invention.

Fluoropolymer

The amide functional ultraviolet light absorbing compound is combined with a fluoropolymer to produce the ultraviolet light absorbing material of the invention. The fluoropolymer contains at least one monomer having a

group. At least one such hydrogen bonding site should be present per molecule of amide functional ultraviolet light absorbing compound to allow for adequate formation of hydrogen bonds between the fluoropolymer and the amide functional ultraviolet light absorbing compound.

The fluoropolymers employed as part of the ultraviolet light absorbing material of the invention are commercially available or may be prepared using polymerization methods known in the art. Detailed information on polymer preparation may be found, for example, in the *Encyclopedia of Polymer Science and Engineering*, 2nd Ed., Vols. 16 and 17, John Wiley & Sons, 1989.

Many fluoropolymers may be used in this invention. Illustrative examples include tetrafluoroethylene-ethylene copolymers. Ethylene-tetrafluoroethylene copolymers can vary in tetrafluoroethylene segments anywhere from 40 to 90%. The ethylene and tetrafluoroethylene are copolymerized in aqueous, nonaqueous, or mixed medium with free-radical initiators and are commercially available from a number of sources. The copolymer unit may be represented as follows:

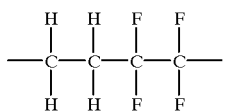

Ethylene-tetrafluoroethylene copolymers perform satisfactorily when exposed to large doses of electron or gamma radiation. Tensile strength is not affected, elongation at room temperature is reduced, stiffness is increased (especially at elevated temperature) and electrical losses are increased. These changes are produced independent of surroundings (air or nitrogen), except for flex life, which is increased by radiation in nitrogen more than by an equal dose in air.

The fluoropolymers may also include vinyl fluoride polymers including homopolymers and copolymers. The base unit of the homopolymers is shown by the following structure:

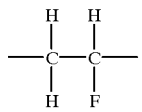

Vinyl fluoride homopolymers and copolymers have excellent resistance to sunlight degradation, chemical attack, water absorption and solvents and a high solar energy transmittance rate. These properties have spread the use of the poly(vinylfluoride) (PVF) films in outdoor and indoor functional and decorative applications. Poly(vinylfluoride) has a greater tendency to crystallize than poly(vinylchloride). It is stable at high temperatures, which is important in any of its applications. Copolymers of vinyl fluoride include copolymerization of a vinyl fluoride monomer with one of the following monomers: vinyl chloride, vinylidene carbonate, acrylonitrile, vinylidene fluoride, vinyl acetate, vinyl formate, hexafluorocyclobutene, ethylene, chlorotrifluoroethylene, and hexafluoropropene. Acrylic monomers including ethylacrylate, acrylic acid, and perfluoromethacryloyl fluoride have also been used as comonomers.

Another fluoropolymer found of benefit for the present invention is a vinylidene fluoride polymer including homopolymers and copolymers. Poly(vinylidenefluoride) otherwise referred to as PVDF is the addition polymer of 1,1-difluoroethene and has the following repeat unit: —$CH_2$—$CF_2$—.

Many copolymers of vinylidene fluoride are known and commercially available such as for example a copolymer prepared from vinylidene fluoride monomer and hexafluoropropylene ($CF_3CF_3$=$CF_2$). The elastomeric terpolymers of vinylidene fluoride, tetrafluoroethylene and hexafluoropropylene are also known as high performance fluoro elastomers. Copolymers of vinylidene fluoride and tetrafluoroethylene are available as well as terpolymers of vinylidene fluoride, hexafluoropropylene and tetrafluoroethylene. Copolymers may also be prepared with vinylidene fluoride monomer with trifluoroethylene and hexafluoroacetone monomers. These have been prepared and reported as important because of their electrical properties. A copolymer of vinylidene fluoride and hexafluoroisobutylene has also been described. Copolymers of polyvinylidene fluoride with acrylic monomers are also useful.

Fluoropolymers also include acrylic or methacrylic polymers containing perfluoroalkyl groups as described, for example, in U.S. Pat. Nos. 5,547,558, 4,566,755, 4,732,941, 4,500,694, 4,742,140, 4,609,715 and 4,569,871. The above patents are not an exclusive list but are merely illustrative and are incorporated herein by reference.

PVDF, the preferred fluoropolymer of the present invention, is also one of the few fluorinated polymers that exhibits compatibility with other polymers and therefore is useful in the preparation of blends with acrylic or methacrylic resins. The morphology, properties and performance of these blends depends on structural and compositional aspects of the additive polymer as well as the particular PVDF resin. The important blend used for the present invention is a blend of PVDF and polymethylmethacrylate (PMMA). Such blends are described, for example, in U.S. Pat. Nos. 5,042,924 and 5,242,976.

In addition to the fluoropolymer and the amide functional ultraviolet light absorbing compound, other components may be present in the polymeric film along with the ultraviolet light absorbing material of the invention. Examples of such additives include waxes, lubricants, antioxidants, preservatives, plasticizers, dyes, pigments, hindered amine light stabilizers (HALS), other stabilizers, and the like. The exact type and amount of additive used will vary according to the type of UVA and polymer used and their relative proportions, the intended final use of the material, and other factors known to those skilled in the art.

The ultraviolet light absorbing material of the invention is prepared by combining the fluoropolymer with the amide functional ultraviolet light absorbing compound. A sufficient amount of the UVA is present to provide good ultraviolet light absorbance without blooming or leaching out of the material. In general, about 0.05 to 35 wt-%, preferably about 0.5 to 10 wt-%, and most preferably about 1.0 to 5.0 wt-% of the amide functional ultraviolet light absorbing compound is present in the material, based on the total material weight.

The ultraviolet light absorbing material is prepared by combining the amide functional ultraviolet light absorbing compound and the fluoropolymer so that hydrogen bonding takes place between them. This may be accomplished by a number of different methods, including melt blending. The polymer and the UVA may also be compounded in an extruder. The presence of hydrogen bonds between the fluoropolymer and the amide functional ultraviolet light absorbing compound may be verified by using analytical methods known in the art, such as by a shift in the IR spectrum of the material. See, for example, March, *Advanced Organic Chemistry*, pp.71–3, 3d Ed., John Wiley & Sons (1985) and Symons, *Chem. Soc. Rev.* 12, pp.1–34 (1983).

The material thus formed may be used directly by forming into a film, or may be blended into other polymers which are then formed into films stabilized against the effects of ultraviolet light.

The Polymeric Film

The polymeric film of the invention is made up of the ultraviolet light absorbing material of the invention in combination with a polymer matrix. The ultraviolet light absorbing material preferably resists blooming and/or migration out of the polymeric matrix, thereby increasing the useful life of articles that are protected by the film, which is used as a top layer.

As described above, the ultraviolet light absorbing material is compatible with the polymeric matrix. Any suitable polymeric matrix can be used in accordance with the invention, dependent in part upon the final application or product which is desired. Illustrative examples of polymeric matrices in which ultraviolet light absorbing materials may be incorporated in accordance with the invention include polyamides, polyacrylates, polycarbonates, polyesters, polyurethanes and polyureas, poly(styrene co-acrylonitriles), polyvinyls, olefin copolymers, and the like. When the light absorbing material of the invention is polyvinylidene fluoride (PVDF) with an amide functional ultraviolet light absorbing compound, a preferred matrix is polymethyl methacrylate (PMMA).

The polymeric film is prepared by combining the ultraviolet light absorbing material of the invention with a polymeric matrix. The ultraviolet light absorbing material is generally present in an amount high enough to provide the resultant polymeric matrix with the ability to absorb ultraviolet light but not so high that the material migrates, separates, or blooms out of the matrix. Typically the polymeric film contains about 0.05 to 20 wt-%, preferably about 0.25 to 5 wt-%, and most preferably about 1.0 to 3.0 wt-% of the ultraviolet light absorbing compound, based on the total weight of the film.

The polymeric film may be prepared by blending a melt of the matrix polymer with a melt of the ultraviolet light absorbing material with stirring continued until the mixture is uniform. After uniformity is achieved, the mixture may be pressed or formed into a film using methods known in the art. The film may also be prepared by melt extrusion compounding of the matrix polymer and the ultraviolet light absorbing material directly into the desired film.

Retroreflective Sheetings

The polymeric films of the invention may be used as the top layer or cover film of a multilayered retroreflective sheeting. Retroreflective sheetings are generally known in the art, as seen for example in Bailey et al., U.S. Pat. No. 4,767,659, which is incorporated herein by reference in its entirety. Polymeric films of the invention may be used as cover films or overlays for embedded-lens and encapsulated-lens sheetings (both microsphere-based and cube corner type); protective underlying layers of retroreflective elements, binder layers, etc. U.S. Pat. Nos. 5,450,235 and 5,691,846, incorporated herein by reference in their entirety, disclose flexible cube corner type retroreflective sheetings in which polymeric films of the invention may be used. The polymeric films provide protection to the lower layers of the sheeting from ultraviolet light, thereby extending the useful life of the sheeting and articles that incorporate the sheeting.

In addition to providing protection from ultraviolet light, when used as the top layer of a retroreflective sheeting, the polymeric film in some instances should additionally be sufficiently extensible to withstand substantial stretching such as the embossing of a license plate, sufficiently soft that it resists localized delamination when stretched to conform to an irregular surface, and should have good impact resistance. Preferably, when used as the top layer of a retroreflective sheeting, the polymeric film has good impact resistance, toughness, and transparency.

Retroreflective sheetings that have the polymeric film of the invention as a top layer or coating layer typically contain multiple layer constructions. Examples of suitable retroreflective sheetings are:

(a) "An encapsulated lens retroreflective sheeting" which includes lens means made of plural transparent microspheres, a support member in which the lens means is partly embedded, a bonding layer having plural linking parts which are bonded to the coating layer so that spaces for encapsulating the transparent microspheres are formed between the coating layer and the bonding layer, and reflectors which are present with contacting the lens means, and is used in the encapsulated lens retroreflective sheet.

(b) "A prismatic retroreflective sheeting" which includes a prism member having a flat surface and plural triangular protrusions for reflecting the incident light back to the incident direction, on a surface opposite to the flat surface, and is used in the prismatic retroreflective sheet which contains a coating layer, a prism member, a coloring layer, a primer layer, an adhesive layer, and a releasing layer (e.g. a liner or a release paper).

(c) "An enclosed lens retroreflective sheeting" which includes lens means made of plural transparent microspheres, a resinous layer in which the lens means is wholly embedded and which is adhered to the coating layer on substantially its whole surface, and reflectors which are present at a certain distance from the lens means, and is used in an enclosed lens retroreflective sheet.

Other layers may be present as desired. Other types of retroreflective elements can be used if desired.

The retroreflective sheetings prepared using the polymeric film of the invention may be applied to a wide variety of articles, including traffic signs, rollup signs, sheetings used on canvas backings, barriers, and cones, as well as embossed license or information plates. The preparation of embossed information plates is described in U.S. Pat. Nos. 5,085,918 and 5,227,194, both of which are incorporated herein by reference in their entirety.

Conformable Marking Sheets

The polymeric films of the invention may also be used in the preparation of conformable pavement marking sheets. Illustrative examples of such conformable marking sheets are described in Lasch et al., U.S. Pat. No. 5,194,113, which is incorporated herein by reference in its entirety.

When used in the preparation of a conformable marking sheet, the polymeric film should be sufficiently ductile to allow the sheet to conform to the surface of the pavement or other substrate in order to improve the adhesion of the sheet to the substrate. When used as a top layer in a conformable marking sheet, the polymeric film preferably includes a visibility enhancing pigment such as titanium dioxide or lead chromate.

The polymeric film top sheet or layer may be extruded or laminated directly onto the other layers of the conformable sheet, or an adhesive or other layer may be interposed between the top layer and other layers of the sheet.

Polymeric films of the invention may also be used as a marking sheet independent of a conforming layer. If used in this manner, the polymeric film may be laminated to a layer of pressure sensitive or other suitable adhesive to improve adhesion to the pavement or other substrate. A release liner may also be present to provide ease of handling and storage. In addition, particles may be fully or partially embedded in the top surface of the film to improve the retroreflectivity and/or skid resistance properties of the film.

The examples which follow are illustrative of the invention and are not intended to be limiting in any way.

EXAMPLES

The following materials were used in the procedures of the examples:

BTOA is 3-(2H-benzotriazol-2-yl)-5-(1,1-dimethylethyl)-N-octyl-4-hydroxybenzenepropaneamide.

Tinuvin 327, 2-(3'5'-di-tert-butyl-2'-hydroxyphenyl)-5-chlorobenzotriazole, is available from Ciba-Geigy Corporation, Hawthorne, N.Y.

Tinuvin 900, 2-(3'5'-bis(1-methyl-1-phenylethyl)-2'-hydroxyphenyl)benzotriazole, is available from Ciba-Geigy Corporation, Hawthorne, N.Y.

Example 1

Preparation of 3-(2H-benzotriazol-2-yl)-5-(1,1-dimethylethyl)-N-octyl-4-hydroxybenzenepropaneamide (BTOA).

2000 g. (5.65 mole) of methyl 3-{3'-(2H-benzotriazol-2"-yl)-5'-tert-butyl-4'-hydroxyphenyl}propionate, sold by Ciba-Geigy as CGL-571, was mixed with 1473 g (11.4 mole) octylamine in a five liter three neck round bottom flask. The flask is equipped with a mechanical stirrer, pot thermometer and a distillation head, condenser and receiver. The mixture was heated with agitation to a pot temperature of 160° C., at which point distillate began to collect. Distillate was collected as the temperature rose to 170° C. A total of 450 g. of distillate was collected and removed.

The remaining reaction mixture was heated to 200° C. and held for one hour, then cooled to 150° C. Gas chromatography (GC) of an aliquot of the product showed no residual ester. An aspirator vacuum was applied and residual amine distilled, followed by application of a vacuum pump and continued distillation until the pot temperature reached 160° C. at 2 mm Hg of vacuum. GC of an aliquot showed <0.2% residual amine, indicating complete reaction.

The reaction was cooled to 120° C. and the molten product poured into aluminum trays. After cooling to room temperature, the product was ground into a fine powder.

The yield of product was 2504 g. (98%), with a melting point of 65–69° C. $^{13}$C NMR analysis of the product confirmed product structure and purity.

Example 2

Procedure to blend UV absorber into polymer for IR experiments:

15 g. Solef 1010 PVDF (Solvay Corp.) or CP82 PMMA (CP Corp.) was blended with 5 g. amide functional UVA (BTOA Example 1) in a Brabender mixing bowl with a 30 cc. volume. The mixture was blended at 200°C. for 15 minutes with a mixing rate of 80 RPM. After mixing the samples were scraped onto an aluminum tray and cooled and a portion collected for IR analysis.

Extruded topfilms with blended UVAs are frequently made in two steps: first compounding of the polymer with the UVA in a single or twin screw extruder, and then extrusion of this blend into the film. Studies have shown that because conventional UVAs have only limited compatibility in PVDF polymer, both steps of this process are difficult. Compounding of conventional UVAs into PVDF polymer is not possible at UVA loadings above 2%. Studies show that extrusion of PVDF films with conventional UVAs is only possible at loadings of less than 0.5%.

Similar results are seen when the topfilms are composed of PVDF/PMMA blends. When PMMA with conventional UVAs is blended with PVDF, the insolubility of the UVAs in the PVDF forces some of the UVAs out of the film, creating processing problems (from coating of portions of the extrusion equipment) and yielding topfilms with lower than desired UVA concentrations, poorer light transmission and suppressed surface gloss.

Experimental evidence supports the conclusion that hydrogen bonding occurs between amide functional UVAs of the present invention (such as BTOA) and PVDF polymer, increasing compatibility and decreasing mobility and therefore blooming.

First, it has been observed that PVDF/PMMA film extrusions using the amide functional UVA BTOA (Example 1) process much better than those using a conventional UVA (Tinuvin 327). There is less screw slippage and also less coating of the rollers with UVA that has bloomed out of the films.

Second, infra-red spectra of PVDF and PMMA polymers blended with BTOA (Example 2) have been acquired. The spectra of BTOA is typical and characteristic of amide materials which are intramolecularly hydrogen bonded. Spectra of PMMA with 25% BTOA shows disruption of the intramolecular hydrogen bonds of the UVA, but no new hydrogen bonds between the UVA and the polymer. Spectra of PVDF with 25% BTOA also shows disruption of the UVA's intramolecular hydrogen bonds, but also shows the existence of new absorption bands, indicating the existence of hydrogen bonds between the UVA and the polymer.

We claim:

1. An ultraviolet light absorbing material comprising a fluoropolymer and an amide functional ultraviolet light absorbing compound, wherein the ultraviolet light absorbing compound is hydrogen bonded to the said fluoropolymer and there is at least 1 hydrogen bonding site on the polymer per mole of ultraviolet light absorbing compound.

2. The material of claim 1 wherein the fluoropolymer comprises an ethylene-tetrafluoroethylene copolymer, a homopolymer or copolymer of vinyl fluoride, a homopolymer or copolymer of vinylidene fluoride or a mixture thereof.

3. The material of claim 1 wherein the fluoropolymer comprises a homopolymer or copolymer of vinylidene fluoride or a mixture thereof.

4. The material of claim 1, wherein the fluoropolymer is polyvinylidene fluoride.

5. The material of claim 1 wherein the amide functional ultraviolet light absorbing compound is present in an amount of about 0.05 to about 35 wt-% based on the total material weight.

6. The material of claim 1 wherein the amide functional ultraviolet light absorbing compound contains a 2-hydroxyphenyl benzotriazole moiety.

7. The material of claim 1 wherein the amide functional ultraviolet light absorbing compound is a compound of formula (I):

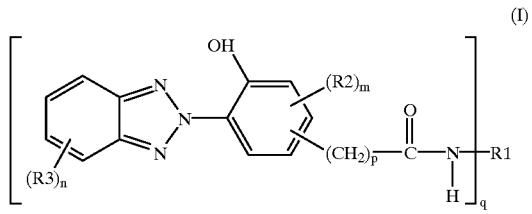

(I)

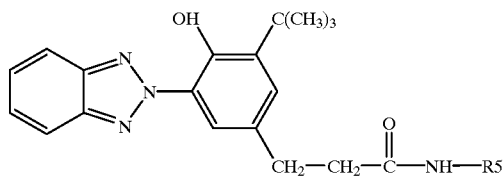

(II)

wherein R1 is straight-chain or branched $C_1$–$C_{18}$ alkyl, straight-chain or branched $C_3$–$C_{18}$ alkyl which is interrupted by O, S or —NR4—, $C_5$–$C_{12}$ cycloalkyl, $C_6$–$C_{14}$ aryl, $C_7$–$C_{15}$ aralkyl in which alkyl is straight-chain or branched, straight-chain or branched $C_3$–$C_8$ alkenyl, or $C_1$–$C_3$ hydroxyalkyl or

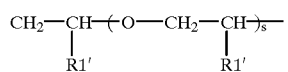

wherein R' is H or straight-chain or branched $C_{1-6}$ alkyl; R4 is H, straight-chain or branched $C_1$–$C_{18}$ alkyl, $C_6$–$C_{12}$ cycloalkyl, straight-chain or branched $C_3$–$C_8$ alkenyl, $C_6$–$C_{14}$ aryl or $C_7$–$C_{18}$ aralkyl which alkyl is straight-chain or branched;

each R2 is independently halogen, hydroxy, straight-chain or branched $C_{1-6}$ alkyl, $C_7$–$C_{18}$ aralkyl in which alkyl is straight-chain or branched, straight-chain or branched $C_{1-6}$ alkoxy, straight-chain or branched $C_{1-6}$ alkanol, amino, straight-chain or branched $C_{1-6}$ alkylamino, straight-chain or branched $C_{1-6}$ dialkylamino;

each R3 is independently halogen, hydroxy, straight-chain or branched $C_{1-6}$ alkyl, $C_7$–$C_{18}$ aralkyl in which alkyl is straight-chain or branched, straight-chain or branched $C_{1-6}$ alkoxy, straight-chain or branched $C_{1-6}$ alkanol, amino, straight-chain or branched $C_{1-6}$ alkylamino, or straight-chain or branched $C_{1-6}$ dialkylamino, or aliphatic or aromatic substituted sulfoxide or sulfone;

m is 0 to 3;

n is 0 to 4;

p is 1 to 6;

q is 1 or 2; and s is 2 to 10.

8. The material of claim 1 wherein the amide functional ultraviolet light absorbing compound is a compound of formula (II):

wherein R5 is straight-chain or branched $C_8$ alkyl.

9. The material of claim 1 wherein R5 is n-octyl or 2-ethylhexyl.

10. The material of claim 1 wherein the amide functional ultraviolet light absorbing compound contains a 2-hydroxybenzophenone moiety.

11. The material of claim 1 wherein the amide functional ultraviolet light absorbing compound is a compound of formula (III):

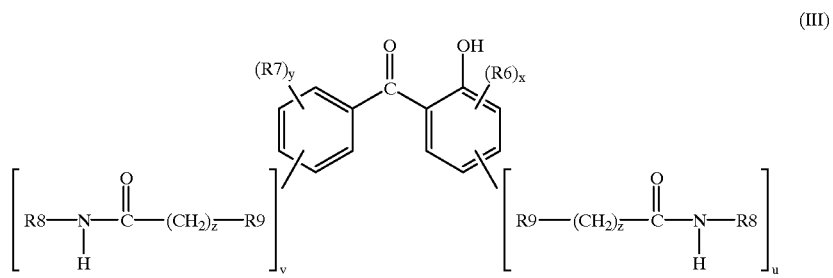

(III)

wherein each R8 is independently straight-chain or branched $C_1$–$C_{18}$ alkyl, straight-chain or branched $C_3$–$C_{18}$ alkyl which is interrupted by O, S or —NR10—, $C_5$–$C_{12}$ cycloalkyl, $C_6$–$C_{14}$ aryl, $C_7$–$C_{15}$ aralkyl in which alkyl is straight-chain or branched, straight-chain or branched $C_3$–$C_8$ alkenyl, or $C_1$–$C_3$ hydroxyalkyl; each R9 is independently a covalent bond, —O—, —S—, —CO—, or —NR10—; R10 is H, straight-chain or branched $C_1$–$C_{18}$ alkyl, $C_6$–$C_{12}$ cycloalkyl, straight-chain or branched $C_3$–$C_8$ alkenyl, $C_6$–$C_{14}$ aryl or $C_7$–$C_{18}$ aralkyl in which alkyl is straight-chain or branched;

each R6 is independently halogen, hydroxy, straight-chain or branched $C_{1-18}$ alkyl, straight-chain or branched $C_{1-6}$ alkoxy, straight-chain or branched $C_{1-18}$ alkanol, amino, straight-chain or branched $C_{1-6}$ alkylamino, or straight-chain or branched $C_{1-6}$ dialkylamino;

each R7 is independently halogen, hydroxy, straight-chain or branched $C_{1-18}$ alkyl, straight-chain or branched $C_{1-18}$ alkoxy, straight-chain or branched $C_{1-18}$ alkanol, amino, straight-chain or branched $C_{1-6}$ alkylamino, or straight-chain or branched $C_{1-6}$ dialkylamino;

u and v are independently 0 or 1, provided that u+v=at least 1;

x is 0 to 4;

y is 0 to 5; and each z is independently 1 to 6.

12. The material of claim 1 wherein the amide functional ultraviolet light absorbing compound is a compound of formula (IV) or (V):

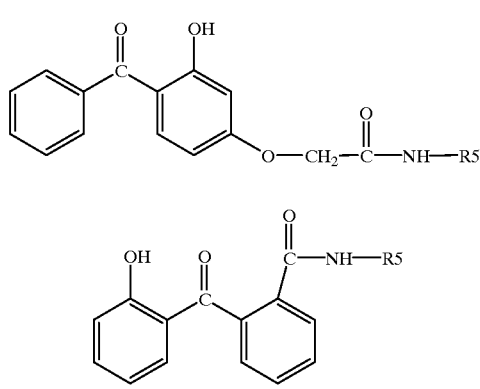

wherein R5 is a straight-chain or branched $C_8$ alkyl group.

13. A polymeric film comprising a polymeric matrix and an ultraviolet light absorbing material, said ultraviolet light absorbing material comprising a fluoropolymer and an amide functional ultraviolet light absorbing compound, wherein the amide functional ultraviolet light absorbing compound is hydrogen-bonded to the fluoropolymer and there is at least 1 hydrogen bonding site on the polymer per mole of ultraviolet light absorbing compound.

14. The film of claim 13 wherein the fluoropolymer comprises an ethylene-tetrafluoroethylene copolymer, a homopolymer or copolymer of vinyl fluoride, a homopolymer or copolymer of vinylidene fluoride or a mixture thereof.

15. The material of claim 13 wherein the fluoropolymer comprises a homopolymer or copolymer of vinylidene fluoride or a mixture thereof.

16. The film of claim 13 wherein the fluoropolymer is polyvinylidenefluoride.

17. The film of claim 13 wherein the polymeric matrix comprises at least one of a polyamide, polyacrylate, polycarbonate, polyester, polyurethane, polyurea, polystyrene acrylonitrile, polyvinyl, and olefin copolymer.

18. The film of claim 13, wherein the polymeric matrix is polymethylmethacrylate.

19. The film of claim 13 wherein the amide functional ultraviolet light absorbing compound is present in an amount of about 0.05 to 5.0 wt-%, based on the total film weight.

20. The film of claim 13 wherein the amide functional ultraviolet light absorbing compound comprises a 2-hydroxyphenylbenzotriazole moiety.

21. The film of claim 13 wherein the amide functional ultraviolet light absorbing compound is a compound of formula (I):

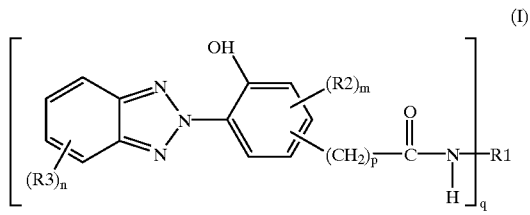

wherein R1 is straight-chain or branched $C_1$–$C_{18}$ alkyl, straight-chain or branched $C_3$–$C_{18}$ alkyl which is interrupted by O, S or —NR4—, $C_5$–$C_{12}$ cycloalkyl, $C_6C_{14}$ aryl, $C_7$–$C_{15}$ aralkyl in which alkyl is straight-chain or branched, straight-chain or branched $C_3$–$C_8$ alkenyl, or $C_1$–$C_3$ hydroxyalkyl or

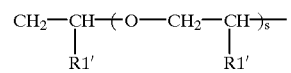

wherein R1' is H or straight-chain or branched $C_{1-6}$ alkyl; R4 is H, straight-chain or branched $C_1$–$C_{18}$ alkyl, $C_6$–$C_{12}$ cycloalkyl, straight-chain or branched $C_3$–$C_8$ alkenyl, $C_6$–$C_{14}$ aryl or $C_7$–$C_{18}$ aralkyl in which alkyl is straight-chain or branched;

each R2 is independently halogen, hydroxy, straight-chain or branched $C_{1-6}$ alkyl, $C_7$–$C_{15}$ aralkyl in which alkyl is straight-chain or branched, straight-chain or branched $C_{1-6}$ alkoxy, straight-chain or branched $C_{1-6}$ alkanol, amino, straight-chain or branched $C_{1-6}$ alkylamino, or straight-chain or branched $C_{1-6}$ dialkylamino;

each R3 is independently halogen, hydroxy, straight-chain or branched $C_{1-6}$ alkyl, $C_7$–$C_{15}$ aralkyl in which alkyl is straight-chain or branched, straight-chain or branched $C_{1-6}$ alkoxy, straight-chain or branched $C_{1-6}$ alkanol, amino, straight-chain or branched $C_{1-6}$ alkylamino, or straight-chain or branched $C_{1-6}$ dialkylamino, or aliphatic or aromatic substituted sulfoxide or sulfone;

m is 0 to 3;

n is 0 to 4;

p is 1 to 6;

q is 1 or 2; and s is 2 to 10.

22. The film of claim 13 wherein the amide functional ultraviolet light absorbing compound is a compound of formula (II):

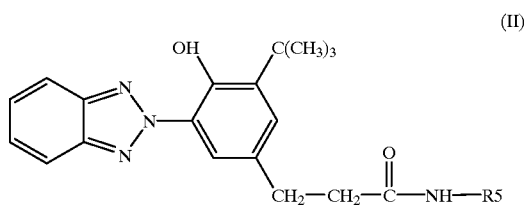

wherein R5 is a straight-chain or branched $C_8$ alkyl group.

23. The film of claim 22 wherein R5 is n-octyl or 2-ethylhexyl.

24. The film of claim 13 wherein the amide functional ultraviolet light absorbing compound comprises a 2-hydroxybenzophenone moiety.

25. A method of protecting a substrate from the effects of ultraviolet light, the method comprising applying a polymeric film to the substrate, said film comprising a polymeric matrix and an ultraviolet light absorbing material, said ultraviolet light absorbing material comprising a fluoropolymer and an amide functional ultraviolet light absorbing compound, wherein the ultraviolet light absorbing compound is hydrogen bonded to the fluoropolymer and there is at least one hydrogen bonding site on the polymer per mole of ultraviolet light absorbing compound.

26. The method of claim 25 wherein the fluoropolymer comprises an ethylene-tetrafluoroethylene copolymer, a homopolymer or copolymer of vinyl fluoride, a homopolymer or copolymer of vinylidene fluoride or a mixture thereof.

27. The method of claim 25 wherein the polymeric matrix comprises a polyvinylidene fluoride.

28. The method of claim 25, wherein the polymeric matrix comprises a polymethylmethacrylate polymer.

29. The method of claim 25 wherein the amide functional ultraviolet light absorbing compound comprises a 2-hydroxyphenylbenzotriazole moiety.

30. The method of claim 25 wherein the amide functional ultraviolet light absorbing compound is a compound of formula (II):

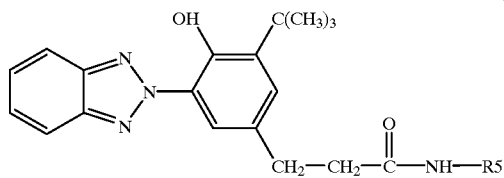

wherein R5 is a straight-chain or branched $C_8$ alkyl group.

31. The method of claim 25 wherein the amide functional ultraviolet light absorbing compound comprises a 2-hydroxybenzophenone moiety.

* * * * *

UNITED STATES PATENT AND TRADEMARK OFFICE
CERTIFICATE OF CORRECTION

PATENT NO.: 5,985,444
DATED: November 16, 1999
INVENTOR(S): David B. Olson, David M. Burns and Bruce B. Wilson It is certified that error appears in the above-identified patent and that said Letters Patent is hereby corrected as shown below:

Column 3, Line 50: Delete "$C_3-C_{18}$" and insert in place thereof -- "$C_3-C_8$" --.

Column 5, Line 30: Delete "$C_{1-8}$" and insert in place thereof -- "$C_{1-18}$" --.

Column 14, Line 52: Delete "$C_{1-6}$" and insert in place thereof -- "$C_{1-18}$"--.

Signed and Sealed this

Twenty-second Day of May, 2001

Attest:

NICHOLAS P. GODICI

*Attesting Officer*   *Acting Director of the United States Patent and Trademark Office*